June 26, 1956

E. L. CLARK ET AL 2,752,210

BEARING CONSTRUCTION

Filed Nov. 18, 1952

INVENTORS
Earl J. Clark, &
BY  Carson O. Donley
Willits, Helwig & Baillie
ATTORNEYS

United States Patent Office 2,752,210
Patented June 26, 1956

2,752,210

BEARING CONSTRUCTION

Earl L. Clark and Carson O. Donley, Indianapolis, Ind., assignors to General Motors Corporation, Detroit, Mich., a corporation of Delaware Application November 18, 1952, Serial No. 321,214

10 Claims. (Cl. 308—238)

This invention relates to improvements in bearing operation and more particularly to an improved bearing assembly.

The bearing loads in modern internal combustion engines and other machinery are much greater than those encountered in older classes of machinery where a thick bearing of babbit was almost universally applicable. Under the bearing loads encountered in internal combustion engines and other modern machinery, one of the principal reasons for bearing failure is the damage caused when abrasive particles present in the lubricating oil work their way between the journal and bearing surfaces to score or cut the journal and gouge or otherwise injure the bearing surface. Hence, to improve the performance of bearings, it is desirable to improve the embeddability of the bearing surface so that the abrasive particles, instead of damaging the journal or bearing, are readily embedded in the bearing. Prior work directed to this problem has considered that poor resistance of a bearing assembly to abrasive contaminant particles was due primarily to a failure of the bearing itself and has resulted in the introduction of grid bearings, bearings formed of special alloys, bearings formed with thin overlay coatings of other metals and other special bearings.

We have now made the surprising discovery that the performance of a bearing depends primarily on the characteristics of the journal instead of the characteristics of the bearing which heretofore have been thought to be the controlling factors. According to the present invention, we have found that the performance of a bearing assembly is greatly improved, using any conventional nonferrous bearing, when the journal element in the bearing assembly is formed of a material which provides not only an extremely hard, wear resistant surface but a surface having a high strength as well. The surface of such a journal not only greatly improves the embeddability of a conventional nonferrous bearings, but also withstands the vibrational, frictional and other stresses encountered during operation under high bearing loads. The preferred journal material is a metallic carbide, such as the commercially available cemented tungsten carbide known as Carboloy #55-A. Under certain conditions other carbide materials having the desired properties may be employed instead of tungsten carbide in the practice of the invention.

According to the present invention the greatly improved bearing operation is obtained with a bearing assembly which comprises a shaft, a relatively soft bearing such as a nonferrous base bearing and a journal element formed of a metallic carbide. The shaft may be formed of a solid metallic carbide in which case the journal surface contemplated in the present invention is the periphery of the shaft, or if desired, the shaft may be formed of another material such as steel with a metallic carbide journal surface formed on the periphery of the steel shaft either as a sleeve or as a deposited coating. Such a carbide coating or sleeve generally may have a thickness within the thickness range of about 0.001" to 0.01" with 0.004" to 0.007" preferred. The nonferrous bearing may either be a single layer of a nonferrous material or it may be formed of a plurality of layers having a wear surface of a nonferrous material. It will be understood, of course, that the nonferrous bearing may be supported by any ordinary backing member formed of steel or other strong material and having any desired shape.

As used in this specification, nonferrous base bearing material is intended to mean a bearing material composed principally of a nonferrous metal such as lead, copper, silver, tin, indium or aluminum; alloys in which nonferrous metals are present in amounts greater than 50% such as bronze, lead base babbit, aluminum alloys, copper base alloys such as copper-lead, copper-lead-tin, lead-base alloys such as lead-tin, lead-indium, lead-copper, or lead-tin-copper; and sintered mixtures of finely divided principally nonferrous metals or alloys. In general, a bearing formed of any conventional nonferrous base bearing material may be used in the practice of the present invention; in the form of a plain or grid bearing or, if desired, as a bearing having an overlay of a nonferrous material. Illustrative of such overlay bearings are copper with an overlay of lead, lead-indium, lead-copper or lead-tin-copper, a copper-lead alloy with an overlay of lead, lead-indium or lead-copper, silver with an overlay of lead, lead-indium or lead-tin, or an aluminum alloy with an overlay of lead, lead-indium, lead copper lead-tin-copper or lead-tin.

The thickness of the nonferrous material may be the same as that of any ordinary nonferrous bearings. In general, the thickness may be within the range of about 0.005 inch to 0.100 inch. If an overlay coating is employed, it also may be applied in any ordinary thickness. In general, such a coating may have a thickness within the range of about 0.0005" to 0.003". The nonferrous bearing material may be applied to the backing member in any suitable manner as by electrodeposition directly on the backing member or over an intermediate strike coat applied to the backing member.

To illustrate how the performance of a nonferrous bearing is greatly improved by employing a metallic carbide journal, embeddability tests have been conducted with standard silver bearings supporting journals formed of different materials. These tests were conducted by driving the journal while the bearing was lubricated with an oil containing carefully controlled amounts of abrasive particles. The amount of abrasive in the oil lubricating the bearing was gradually increased until a failure of the particular journal-bearing combination occurred. A bearing failure was indicated either by a prolonged increase in the bearing power consumption or by an excessive bearing temperature.

The tests were conducted in a centrifugally loaded test machine using as abrasives, silica ($SiO_2$) and in some cases alumina ($Al_2O_3$) having Knoop hardnesses of approximately 820 and 2000 respectively. The abrasive was introduced into the oil lubricating the test bearing in the form of paraffin capsules each containing 0.05 gram of abrasive material having a particle size of about 150 to 178 microns. The abrasive capsules were injected at three minute intervals while the bearing load was 2000 p. s. i. and the journal speed was 2500 R. P. M. Fifteen seconds after the abrasives were injected, the speed was increased to 3000 R. P. M., decreased to 2000 R. P. M. and returned to 2500 R. P. M. within a period of 45 seconds. These change were incorporated to reduce the possibility of unstable bearing operation when a succeeding abrasive capsule was introduced. If no bearing failure had occurred after 75 abrasive charges had been introduced in this manner the test was stopped.

The results of such embeddability tests are shown in Table I.

TABLE I

| Journal | | Bearing | No. of Abrasive Injections to Cause Failure | |
|---|---|---|---|---|
| Material | Vickers Hardness | | | |
| SAE 1045 Steel | 240 | Silver | Silica | 3. |
| Do | 390 | do | Alumina | 1. |
| Do | 390 | do | Silica | 2. |
| Do | 566 | do | do | 10. |
| Nitrided AMS 6480 | 627 | do | do | 6. |
| Chromium Plated SAE 1045 | 707 | do | do | 2. |
| Nitrided AMS 6415 | 824 | do | do | 7. |
| Nitrided AMS 6475 | 864 | do | do | 6. |
| Cemented Tungsten Carbide | 1310 | SAE 1045 Steel | do | 0. |
| Do | 1310 | Silver | do | No Failure. |
| Do | 1310 | do | Alumina | Do. |
| Do | 1310 | AMS 4822, Copper-Lead-Tin | Silica | Do. |
| Do | 1310 | Lead-Base Babbit | do | Do. |
| Do | 1310 | Sintered Copper-Base Material | do | 46. |
| SAE 1045 Steel Shaft Coated with Cemented Tungsten Carbide. | 1355 | Aluminum Alloy | do | No Failure. |

The composition of the various materials forming the journals tabulated in Table I are given in the following table in per cent by weight:

TABLE II

*Journal material composition*

| Journal Material | Elements | | | | | | |
|---|---|---|---|---|---|---|---|
| | C | Mn | Al | Ni | Cr | Mo | Others |
| SAE 1045 Steel | 0.43-0.50 | 0.60-0.90 | | | | | |
| Nitrided AMS 6480 | 0.32-0.38 | 0.70-0.90 | | 0.50-0.80 | 0.90-1.20 | 0.90-1.10 | |
| Nitrided AMS 6415 | 0-38-0.43 | 0.65-0.85 | 0.89 | 1.65-2.00 | 0.70-0.90 | 0.20-0.30 | |
| Nitrided AMS 6475 | 0.21-0.26 | 0.50-0.70 | 1.10-1.40 | 3.25-1.40 | 1.00-1.25 | 0.20-0.30 | |
| Cemented Tungsten Carbide | | | | | | | {Co-13 {WC-87 |

It will be seen from the data of Table I that a silver bearing, operated in combination with a cemented tungsten carbide journal, does not fail in tests which readily caused failure of similar silver bearings operated with journals formed of other materials. The combination of extreme hardness, low internal stress and high strength of the cemented tungsten carbide journal not only enables it to withstand the stresses encountered under high bearing loads but also to operate successfully with extreme levels of contaminants in lubricating oil with no measurable wear of bearing or journal. Employing a carbide journal, the abrasive particles are almost instantaneously embedded in the surface of the nonferrous base bearing which, in comparison to the journal, is relatively soft.

Bearing surfaces operated with journals formed of softer materials show grooving and gouging caused by an intimate contact with the abrasive particles, the roughened journal or by chips cut from the journal. However, the bearing surfaces which were run against cemented tungsten carbide journals, having a surface hardness greater than the hardness of oil contaminant particles, showed very little grooving or gouging. The tungsten carbide journal also resists other journal surface failures, such as the cracking, cutting and spalling frequently encountered with highly stressed surfaces, which would lead to welding or seizure of the bearing surface. The tests indicate that more material is removed from a soft journal than from a hard journal by a single injection of abrasive particles. It is thought that the softer journals more readily cause the failure of nonferrous bearings because at a given oil film thickness, bearing and journal contact occurs more readily due to the rougher surface of the softer journals.

Referring now to the accompanying drawing.

Figure 1:
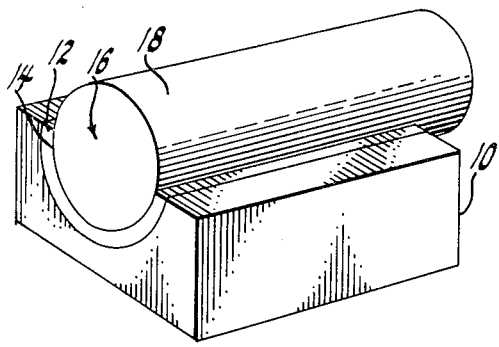
Figure 1 is a perspective view of a partial bearing assembly in accordance with one embodiment of the invention.
Figure 2:
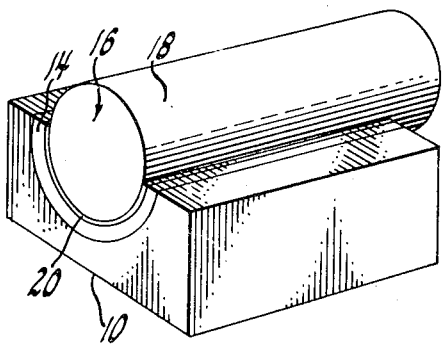
Figure 2 is a view similar to Figure 1 illustrating the use of a different type bearing.
Figure 3:
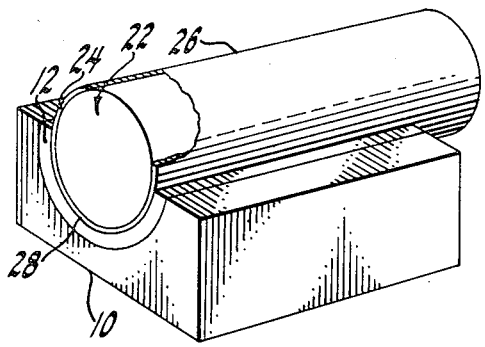
Figure 3 is a perspective view of a partial bearing assembly in accordance with another embodiment of the invention.
Figure 4:
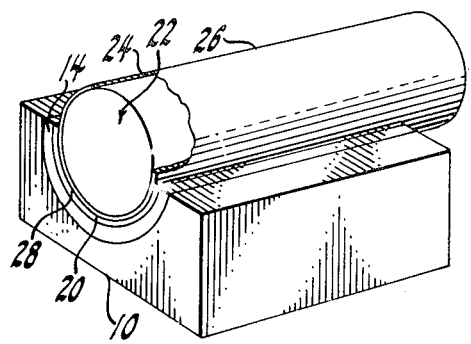
Figure 4 is a view similar to Figure 3 illustrating the use of a different type bearing.

Referring more particularly to the figures of the drawing which illustrate various applications of the invention: In Figure 1 is shown a partial bearing assembly comprising a backing member 10 formed of a strong material such as steel, a nonferrous base bearing member 12 supported by said backing member 10 and a shaft 16 of a metallic carbide having a journal surface 18 cooperating with the surface of bearing member 12. In Figure 2 is shown a backing member 10, a shaft 16 of a metallic carbide and journal surface 18 cooperating with a bearing member 14 having a thin overlay coating 20 of a nonferrous material. In Figure 3 is shown a backing member 10 supporting a nonferrous base bearing member 12 and a shaft 22 of steel or other strong material having a thin coating 24 of a metallic carbide forming a journal wear surface 26 cooperating with the surface of the bearing member 12 at interface 28. In Figure 4 is shown a backing member 10 supporting a bearing 14 having a thin overlay coating 20 of a nonferrous material and a shaft 22 of steel or other material having a thin coating 24 of a metallic carbide forming a journal surface 26 cooperating with the surface of the overlay coating 20. The coating 24 illustrated in Figures 3 and 4 may be a sleeve of a metallic carbide fitted on the shaft or may be a coating of a metallic carbide deposited on the shaft in any suitable manner.

While very beneficial results have been obtained employing a bearing assembly comprising a shaft member having a cemented tungsten carbide journal surface in the form of a sleeve or coating of carbide and a bearing surface of a nonferrous material as, for example, a bearing surface of silver, bronze or a lead base or tin base babbit, equally satisfactory results have been obtained when the bearing assembly comprises a shaft member of solid cemented tungsten carbide and a bearing surface of nonferrous material such as silver, bronze or a lead-base or tin-base babbit.

We have found that by using a metallic carbide journal with nonferrous base bearing materials according to the present invention, a bearing performance is obtained which is much better than may be obtained under similar bearing loads by using a conventional steel journal with a bearing having a thin overlay coating of another metal. This has a great practical importance because not only is it expensive to form the original overlay coating, usually by electroplating, but it must be replaced when it is worn away.

While the specification thus far has described the use of cemented tungsten carbide as the preferred journal material, it is to be understood that under certain conditions carbides other than tungsten carbide providing an extreme hardness and a high strength together with a low internal stress level also may be used as journal elements in the practice of this invention. These materials are to be contrasted, however, with other materials such as nitrided steels, chromium plated steels, etc., which merely have a hardened surface which is unable to withstand the high stresses encountered with high bearing loads.

The present invention may be employed in many different applications in automobile, truck, diesel, aircraft and other internal combustion engines as well as in other machine applications. It will be understood that various changes and modifications of the embodiments of the invention described herein may be made by those skilled in the art without departing from the spirit and principles of the invention.

We claim:

1. A bearing assembly comprising a combination of surfaces capable of relative movement, one of said surfaces being formed of a metallic carbide and the other surface of a relatively soft non-ferrous metallic bearing material.

2. In combination, a tungsten carbide journal surface and a cooperating bearing formed of a metallic nonferrous base material.

3. In combination, a metallic carbide journal surface and a cooperating bearing surface formed of a metallic nonferrous base material.

4. In combination, a tungsten carbide journal surface and a cooperating bearing surface formed of a relatively soft metallic non-ferrous bearing material.

5. A bearing assembly as in claim 2 in which there is a thin overlay coating of a metallic nonferrous material on said non-ferrous bearing.

6. In combination, a cemented tungsten carbide journal element and a silver bearing surface.

7. In combination, a cemented tungsten carbide journal element and a bronze bearing surface.

8. A bearing assembly comprising in combination, a metallic nonferrous base bearing member, a backing member supporting said bearing member and a shaft cooperating with said bearing member, said shaft having a wear surface of a metallic carbide.

9. In combination, a cemented tungsten carbide journal element and a bearing member comprising a base member of silver having a thin overlay coating of a relatively soft metallic nonferrous base material.

10. In combination, a shaft, a relatively soft metallic nonferrous bearing and a journal element, said journal element comprising a thin coating of a metallic carbide formed around the periphery of said shaft.

References Cited in the file of this patent

UNITED STATES PATENTS

| | | |
|---|---|---|
| 2,392,917 | Guinee | Jan. 15, 1946 |
| 2,482,205 | Potts | Sept. 20, 1949 |
| 2,512,901 | Litton | June 27, 1950 |
| 2,590,761 | Edgar | Mar. 25, 1952 |
| 2,602,709 | Wheildon | July 8, 1952 |
| 2,613,119 | Seeman | Oct. 7, 1952 |

FOREIGN PATENTS

| | | |
|---|---|---|
| 104,066 | Australia | May 24, 1938 |